May 29, 1951  T. F. E. FUCHSLOCHER  2,555,189
VARIABLE PITCH V-PULLEY
Filed Dec. 24, 1947
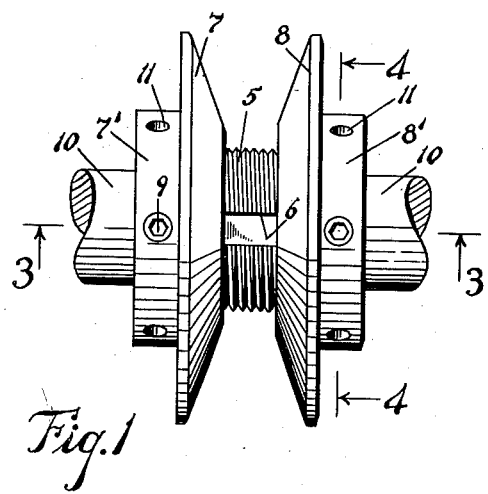
Fig.1
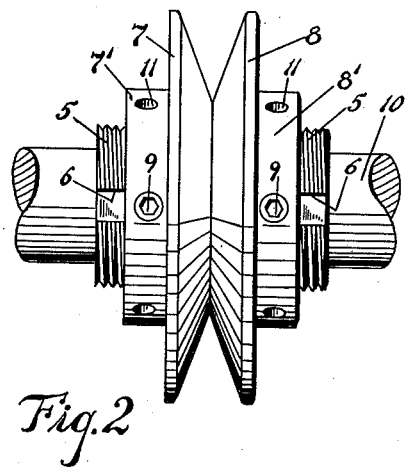
Fig.2
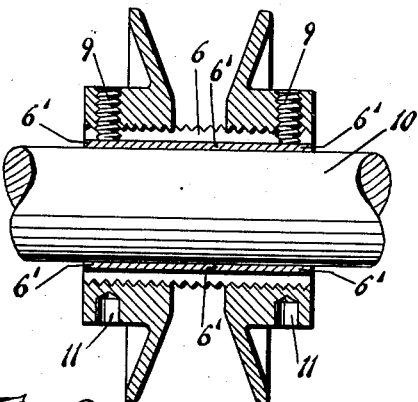
Fig.3
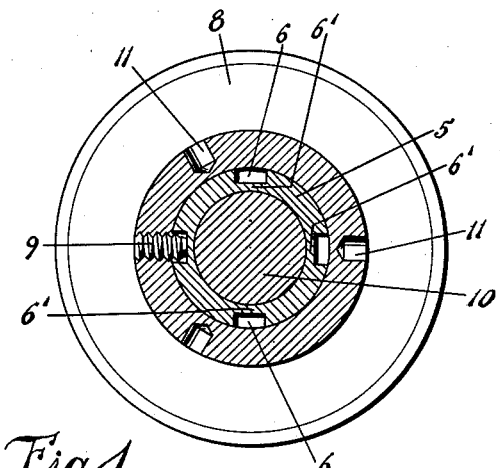
Fig.4
INVENTOR,
Theodor F. E. Fuchslocher
BY
ATTORNEY.

UNITED STATES PATENT OFFICE 2,555,189

VARIABLE PITCH V-PULLEY

Theodor F. E. Fuchslocher, Van Nuys, Calif.

Application December 24, 1947, Serial No. 793,711

1 Claim. (Cl. 74—230.17)

This invention relates to variable pitch V-pulleys, and more particularly to certain improvements in V-pulleys wherein and whereby the parts of said pulley can be adjusted to and from each other to increase the belt space therebetween, and whereby said parts can be quickly and effectively secured to the shaft on which they are mounted.

One of the principal objects of this invention is to provide means for securing the pulley part to the shaft on which it is mounted without the necessity of having a channel or key-way formed in the shaft.

Another object of the invention is to provide a bushing on which the two parts of the pulley are threaded for adjustment toward and from each other by turning one or both parts, with new means for securing the pulley parts to said bushing, to prevent further turning thereon, and by further tightening of said securing means to secure said bushing to the shaft on which it is mounted.

Another object of the invention is to provide a bushing to fit upon a shaft, which bushing has cut or formed therein channels extending lengthwise thereof and which reduce the thickness of the bushing wall in the bottom of the channel or chanels formed therein, the purpose of this being to sufficiently weaken the wall of the bushing next to the shaft on which it is mounted, that any pulley or gear mounted on said bushing can be secured on the bushing and also to the shaft by a set screw the inner end of which operates in said channel in said bushing and forces the wall of said bushing into frictional holding engagement with the shaft, thus securing both pulley and bushing to the shaft for operation.

In order to explain my invention, I have illustrated the same on the accompanying sheets of drawings in which:

Figure 1 is a side view of a V-pulley, on a threaded bushing, on a shaft, with the parts of the pulley separated to widen the space therebetween for a belt;

Figure 2 is a similar view with the pulley parts together;

Figure 3 is a sectional view taken through Figure 1 on the line 3—3; and

Figure 4 is a sectional view taken on the line 4—4, Fig. 1.

Referring now in detail to the drawings, my invention as here shown for explanatory purposes includes a bushing 5, externally threaded as shown, and provided with a plurality of channels 6, 6, cut or formed therein and extending lengthwise thereof, said channels providing the reduced thickness, as at 6', of the wall of said bushing, for a purpose again referred to.

Threaded on said bushing are two pulley parts 7 and 8, here indicated of beveled form for a V-belt, and each having a hub portion, as 7' and 8', provided with a plurality of set screws of the Allen type, and all designated 9.

Said bushing 5 is mounted on a shaft 10, shown to be smooth and without any key-ways or other channels formed therein, making it possible to adjust the bushing on the shaft at any position along the length of said shaft.

One of the principal objects and advantages of the invention is the provision of the channels 6, 6, therein to receive the inner ends of the set screws, to prevent further turning of the pulley parts on said bushing, and also, when tightened, to so press the bottom of the channel of the bushing against the shaft that said bushing and said pulley parts are securely held on the shaft.

Thus I have provided a very simple, but a very practicable means for quickly locking a pulley or gear or the like to a shaft by providing a weakened part in the wall of the pulley or gear next to the shaft, with a set screw set therein against said weakened portion of said wall whereby it can be frictionally forced into holding engagement with a shaft, and while I have shown and described a preferred and effective embodiment of the invention, I do not limit the invention to the details here shown, except as I may be limited by the hereto appended claim.

I claim:

A pulley mounting including in combination with a shaft, a bushing externally threaded and having a channel formed in its outer side, whereby the wall of said bushing in the bottom of said channel is made thinner, to be flexed, two pulley parts each having a hub portion, threaded on said bushing and movable toward and from each other thereon by turning on said threads, a setscrew through each hub portion of said pulley parts and extended into said channel and against the bottom of said channel, whereby tightening said setscrew flexes said wall into frictional holding engagement with said shaft.

THEODOR F. E. FUCHSLOCHER.

REFERENCES CITED

The following references are of record in the file of this patent:

UNITED STATES PATENTS

| Number | Name | Date |
|---|---|---|
| 106,756 | Whitmore | Aug. 23, 1870 |
| 709,644 | McLellan | Sept. 23, 1902 |
| 2,199,362 | Meyer | Apr. 30, 1940 |
| 2,234,917 | Koch | Mar. 11, 1941 |

FOREIGN PATENTS

| Number | Country | Date |
|---|---|---|
| 25,180 | Great Britain | A. D. 1912 |